(12) United States Patent
Otaki et al.

(10) Patent No.: US 6,328,667 B1
(45) Date of Patent: Dec. 11, 2001

(54) TRACTION DISTRIBUTING APPARATUS FOR MOTOR VEHICLE

(75) Inventors: Mizuo Otaki; Toru Fujie; Takashi Tanaka; Teruhiko Mochizuki, all of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/533,941

(22) Filed: Mar. 23, 2000

(30) Foreign Application Priority Data

Mar. 25, 1999 (JP) .................................................. 11-080861

(51) Int. Cl.$^7$ .................................................. F16H 48/20
(52) U.S. Cl. ............................. 475/84; 74/650; 74/606 R
(58) Field of Search ............................. 475/84, 220, 221, 475/230, 86; 74/650, 606 R

(56) References Cited

U.S. PATENT DOCUMENTS 5,759,128 * 6/1998 Mizutani et al. ..................... 425/149

FOREIGN PATENT DOCUMENTS 3-50028 3/1991 (JP) .
WO 95/04890 * 2/1995 (WO) .

* cited by examiner

*Primary Examiner*—Sherry Estremsky
*Assistant Examiner*—Tisha D. Lewis
(74) *Attorney, Agent, or Firm*—Foley & Lardner

(57) ABSTRACT

A traction distributing apparatus includes a first block engaged with a motor casing wit its rotation being restricted and having an end face which comes in plane contact with an end face of a cylinder block so as to allow fluid communication between their passages, and a second block engaged with the housing or the motor casing with its rotation being restricted and having an end face which comes in plane contact with an end face of the motor casing or the housing so as to allow fluid communication between their passages. A first biasing mechanism is arranged with the first block to hydraulically bias the first block to the end face of the inner rotor, and a second biasing mechanism is arranged with the second block to hydraulically bias the second block to the end face of the motor casing or the housing.

13 Claims, 13 Drawing Sheets

TRACTION DISTRIBUTING APPARATUS FOR MOTOR VEHICLE

BACKGROUND OF THE INVENTION

The present invention relates to a traction distributing apparatus for a motor vehicle, which allows active control of the ratio of traction to be distributed to right and left wheels.

One of the traction distributing apparatus for a motor vehicle is disclosed, for example, in JP-A 3-50028. This apparatus includes, in a housing, a differential gear for transmitting traction to right-wheel and left-wheel shafts in such a way as to eliminate the difference in the number of revolutions between right and left wheels, and a hydraulic motor for providing relative torque to the two shafts as required. Upon cornering of the vehicle, for example, the hydraulic motor is actuated to allow an outside wheel to receive greater torque than an inside wheel, producing a yaw moment in the vehicle.

The hydraulic motor includes a casing mounted to an inner peripheral wall of a differential casing, an inner rotor mounted to one of the wheel shafts, and inner passages connected to supply/discharge passages of the housing through annular passages formed in the outer peripheral surface of the casing. Each annular passage is defined by a pair of resin seal rings fixed to the inner peripheral surface of the housing or the outer peripheral surface of the motor casing. By making a peripheral end of each seal ring slidably closely contact the inner peripheral surface of the housing or the outer peripheral surface of the motor casing, the hydraulic motor can always ensure supply/discharge of hydraulic fluid regardless of rotation of the motor casing.

In the above traction distributing apparatus, the resin seal rings are disposed between the inner peripheral surface of the housing and the outer peripheral surface of the motor casing, and the annular passages defined by the seal rings ensure fluid communication between the supply/discharge passages of the housing and the inner passages of the hydraulic motor. With such structure, the seal rings are difficult to surely be mounted without any possible leakage of hydraulic fluid, and are easy to deteriorate with time due to their slide contact with the peripheral surface of the housing or the motor casing, having an inconvenience of difficult maintenance of the stable sealing performance during a long period of time. Moreover, in the case of a hydraulic motor having inner passages formed in an inner rotor, further connection should be carried out between the passages of the inner rotor and passages of a motor casing in the same way, resulting in more difficult mounting of the seal rings and easier occurrence of leakage of hydraulic fluid with years of use.

It is, therefore, an object of the present invention to provide a traction distributing apparatus for a motor vehicle, which is easy to assemble, and allows fluid communication between the supply/discharge passages of the housing and the inner passages of the inner rotor of the hydraulic motor to continuously surely be maintained without any leakage of hydraulic fluid.

SUMMARY OF THE INVENTION

One aspect of the present invention lies in providing a traction distributing apparatus for a motor vehicle with wheel shafts, comprising:

a housing formed with first passages;

a differential gear rotatably arranged in said housing, said differential gear including a casing, said differential gear distributing torque transmitted to said differential casing to the wheel shafts;

a motor rotatably arranged in said housing, said motor hydraulically providing relative torque to the wheel shafts, said motor including an inner rotor and a casing, said inner rotor being connected to one of the wheel shafts, said motor casing being connected to one of said differential casing and another of the wheel shafts, said inner rotor and said motor casing being formed with second passages and third passages, respectively;

a first block arranged between said inner rotor and said motor casing, said first block having an end face which slidably rotatably comes in plane contact with an end face of an inner rotor, said first block being formed with fourth passages which ensure fluid communication between said second passages and said third passages;

a second block arranged between said motor casing and said housing, said second block having an end face which slidably rotatably comes in plane contact with an end face of one of adjacent members, said second block being formed with fifth passages which ensure fluid communication between said first passages and said third passages;

a first biasing mechanism arranged with said first block, said first biasing mechanism hydraulically biasing said first block to said end face of said inner rotor; and a second biasing mechanism arranged with said second block, said second mechanism hydraulically biasing said second block to said end face of said one of said adjacent members.

Another aspect of the present invention lies in providing a traction distributing apparatus for a motor vehicle with wheel shafts, comprising:

a housing formed with first passages;

a differential gear rotatably arranged in said housing, said differential gear including a casing, said differential gear distributing torque transmitted to said differential casing to the wheel shafts;

a motor rotatably arranged in said housing, said motor hydraulically providing relative torque to the wheel shafts, said motor including an inner rotor and a casing, said inner rotor being connected to one of the wheel shafts, said motor casing being connected to one of said differential casing and another of the wheel shafts, said inner rotor and said motor casing being formed with second passages and third passages, respectively;

a first block arranged between said inner rotor and said motor casing, said first block having an end face which slidably rotatably comes in plane contact with an end face of an inner rotor, said first block being formed with fourth passages which ensure fluid communication between said second passages and said third passages;

a second block arranged between said motor casing and said housing, said second block having an end face which slidably rotatably comes in plane contact with an end face of one of adjacent members, said second block being formed with fifth passages which ensure fluid communication between said first passages and said third passages;

first biasing means, arranged with said first block, for hydraulically biasing said first block to said end face of said inner rotor; and second biasing means, arranged with said second block, for hydraulically biasing said second block to said end face of said one of said adjacent members.

Still another aspect of the present invention lies in providing a traction distributing apparatus for a motor vehicle with wheel shafts, comprising:

a housing formed with first passages;

a differential gear rotatably arranged in said housing, said differential gear including a casing, said differential gear distributing torque transmitted to said differential casing to the wheel shafts;

a motor rotatably arranged in said housing, said motor hydraulically providing relative torque to the wheel shafts, said motor including an inner rotor and a casing, said inner rotor being connected to one of the wheel shafts, said motor casing being connected to one of said differential casing and another of the wheel shafts, said inner rotor and said motor casing being formed with second passages and third passages, respectively;

a first block arranged between said inner rotor and said motor casing, said first block being axially slidably engaged with one of adjacent members with its rotation being restricted, said first block having an end face which slidably rotatably comes in plane contact with an end face of an inner rotor, said first block being formed with fourth passages which ensure fluid communication between said second passages and said third passages;

a second block arranged between said motor casing and said housing, said second block being axially slidably engaged with another of said adjacent members with its rotation being restricted, said second block having an end face which slidably rotatably comes in plane contact with an end face of said one of said adjacent members, said second block being formed with fifth passages which ensure fluid communication between said first passages and said third passages;

a first biasing mechanism arranged with said first block, said first biasing mechanism hydraulically biasing said first block to said end face of said inner rotor; and a second biasing mechanism arranged with said second block, said second mechanism hydraulically biasing said second block to said end face of said one of said adjacent members.

A further aspect of the present invention lies in providing a traction distributing apparatus for a motor vehicle with wheel shafts, comprising:

a housing formed with first passages;

a differential gear rotatably arranged in said housing, said differential gear including a casing, said differential gear distributing torque transmitted to said differential casing to the wheel shafts;

a motor rotatably arranged in said housing, said motor hydraulically providing relative torque to the wheel shafts, said motor including an inner rotor and a casing, said inner rotor being connected to one of the wheel shafts, said motor casing being connected to one of said differential casing and another of the wheel shafts, said inner rotor and said motor casing being formed with second passages and third passages, respectively;

a first block arranged between said inner rotor and said motor casing, said first block being axially slidably engaged with an inner periphery of one of adjacent members with its rotation being restricted, said first block having an end face which slidably rotatably comes in plane contact with an end face of an inner rotor, said first block being formed with fourth passages which ensure fluid communication between said second passages and said third passages;

a second block arranged between said motor casing and said housing, said second block being axially slidably engaged with an outer periphery of said one of said adjacent members with its rotation being restricted, said second block having an end face which slidably rotatably comes in plane contact with an end face of another of said adjacent members, said second block being formed with fifth passages which ensure fluid communication between said first passages and said third passages;

a first biasing mechanism arranged with said first block, said first biasing mechanism hydraulically biasing said first block to said end face of said inner rotor; and a second biasing mechanism arranged with said second block, said second mechanism hydraulically biasing said second block to said end face of said another of said adjacent members.

DETAILED DESCRIPTION OF THE INVENTION

Figure 1:
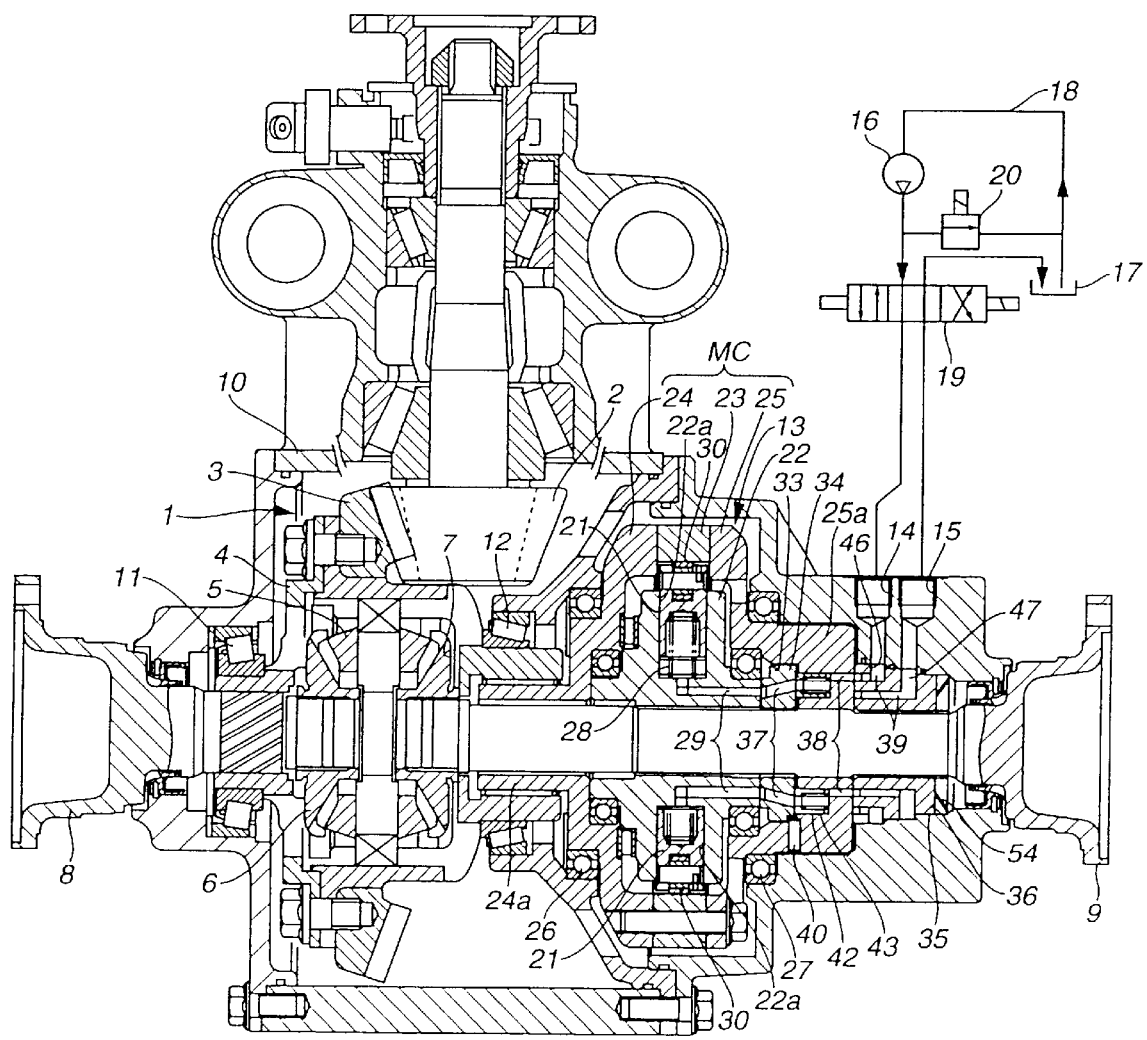
FIG. 1 is a longitudinal section showing a first embodiment of a traction distributing apparatus for a motor vehicle according to the present invention.

Referring to the drawings wherein like reference numerals designate like parts throughout the views, a traction distributing apparatus for a motor vehicle embodying the present invention Will be described.

FIGS. 1–12 show a first embodiment of the present invention. Referring to FIG. 1, the traction distributing apparatus comprises a differential gear 1 of the bevel-gear type so called, which transmits, through a drive pinion 2 and a ring gear 3, torque of a propeller shaft, not shown, connected to an engine to a differential casing 4. Torque of the differential casing 4 is equally distributed to right-wheel and left-wheel shafts 9, 8 through a differential pinion 5 and side gears 6, 7. Rotation of the differential pinion 5 operates to absorb the difference in the number of revolutions of the wheel shafts 9, 8. Specifically, the differential casing 4 is rotatably supported by a housing 10 of the apparatus fixed to a vehicle body through bearings 11, 12, and has an inner peripheral wall to which the differential pinion 5 is rotatably mounted. Meshed with the differential pinion 5 from both sides are the side gears 7, 6 connected to the right-wheel and left-wheel shafts 9, 8.

Figure 2:
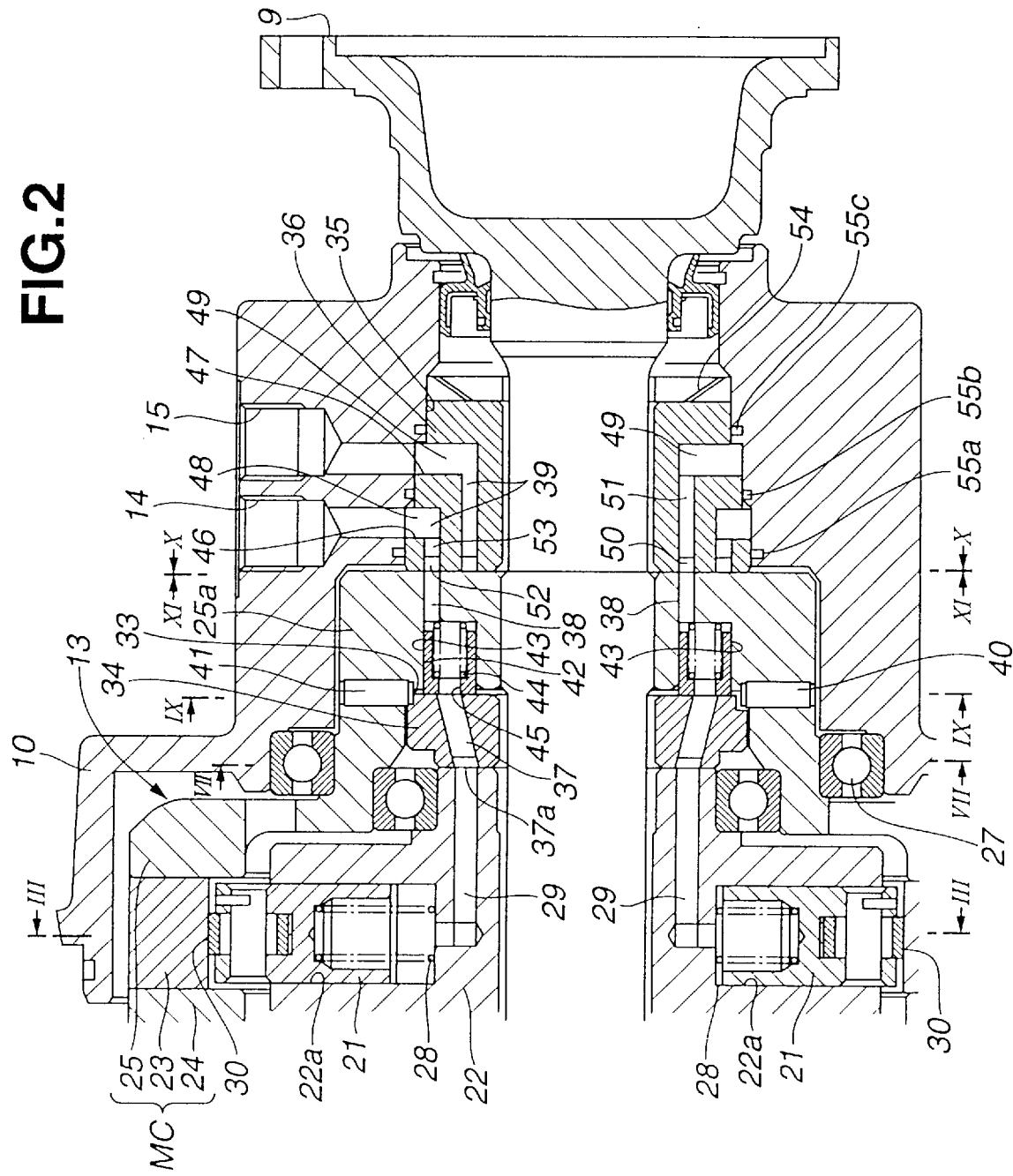
FIG. 2 is a fragmentary enlarged view showing the main part of FIG. 1.

The traction distributing apparatus includes a radial-plunger type hydraulic motor 13 disposed in the housing 10 to be axially adjacent to the differential gear 1 and for providing relative torque to the wheel shafts 9, 8, and supply/discharge passages 14, 15 formed at one end or a right end of the housing 10 as viewed in FIGS. 1–2 and for ensuring supply/discharge of hydraulic fluid with respect to the hydraulic motor 12. The supply/discharge passages 14, 15 are connected to a hydraulic circuit 18 with a hydraulic pump 16 and a reservoir 17 through a passage selector valve 19. The passage selector valve 19 is controlled by a controller, not shown, to carry out switching of supply/discharge of hydraulic fluid. The passage selector valve 19 is in the form of a four-port three-position selector valve which ensures, in the neutral position, fluid communication between each supply/discharge passage 14, 15 and the reservoir 17, and allows, when switched from the neutral position to the right or left position, supply of high-pressure hydraulic fluid to the supply/discharge passage 14 and return of hydraulic fluid of the supply/discharge passage 15 to the reservoir 17. The hydraulic circuit 18 also includes a pressure control valve 20.

Figure 3:
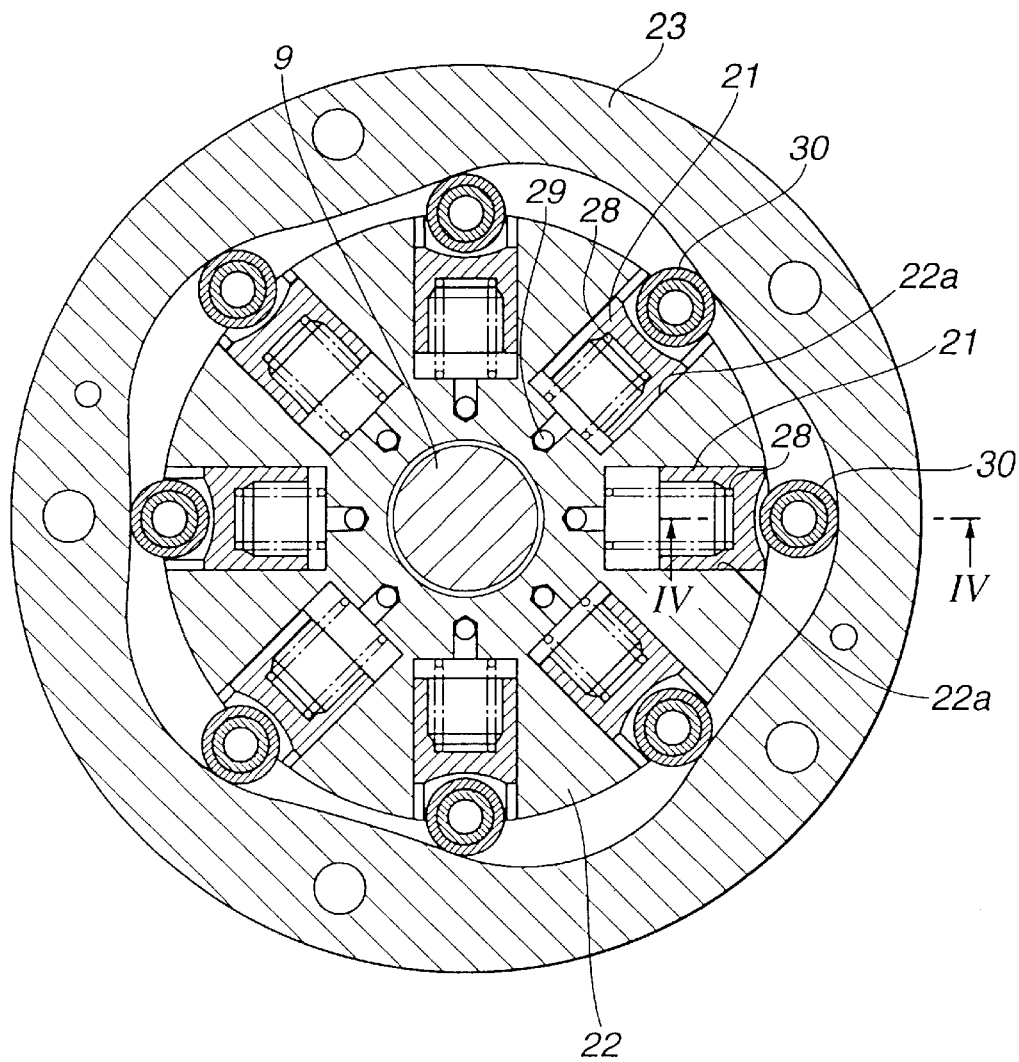
FIG. 3 is a sectional view taken along the line III—III in FIG. 2.

Referring to FIGS. 1–3, the hydraulic motor 13 comprises a cylinder block 22 having plungers 21 radially and in-and-out movably mounted thereto, and a cam ring 23 disposed at the outer periphery of the cylinder block 22 to be engaged with a head of each plunger 21. Side covers 24, 25 are integrally connected to both sides of the cam ring 23, and include bosses 24a, 25a extending axially. In the present invention, the cylinder block 22, which is integrally connected to the right-wheel shaft 9, constitutes an inner rotor, and the cam ring 23 and the side covers 24, 25 constitute a motor casing MC.

The side covers 24, 25 are rotatably supported by the housing 10 through bearings 26, 27. The boss 24a of the left side cover 24 as viewed in FIGS. 1–2 is spline coupled to the differential casing 4. Thus, the motor casing MC comprising the cam ring 23 and the side covers 24, 25 are always rotated together with the differential casing 4.

The cylinder block 22 has cylinder holes 22a radially formed and each receiving a spring 28 for biasing the plunger 21 to the cam ring 23, and inner passages 29 each having an opening at one end face of the cylinder block 22 and allowing supply/discharge of hydraulic fluid for the corresponding cylinder hole 22a. Circumferentially alternate ones of the inner passages 29 make pairs so that when hydraulic fluid is supplied to one pairs, it is discharged from the other pairs. The profile of an inner peripheral surface of the cam ring 23 is determined such that when supply/discharge of hydraulic fluid are alternately carried out with respect to one pairs and the other pairs of the inner passages 29, the plungers 21 provide continuous rotary motion to the cam ring 23.

Figure 4:
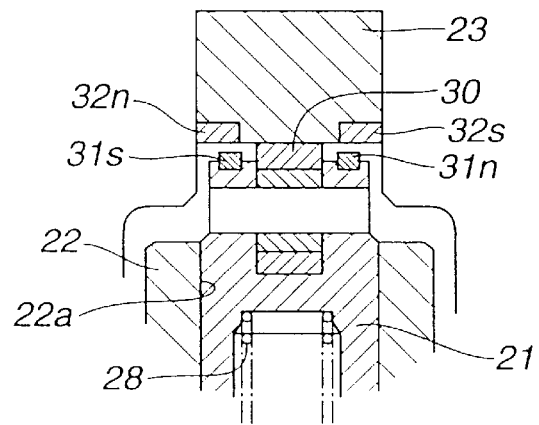
FIG. 4 is a view similar to FIG. 3, taken along the line IV—IV in FIG. 3.
Figure 5:
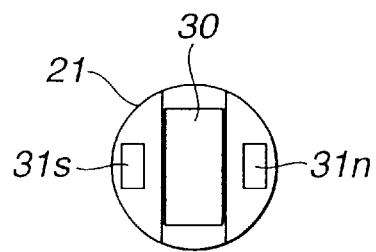
FIG. 5 is a plan view showing a plunger.
Figure 6:
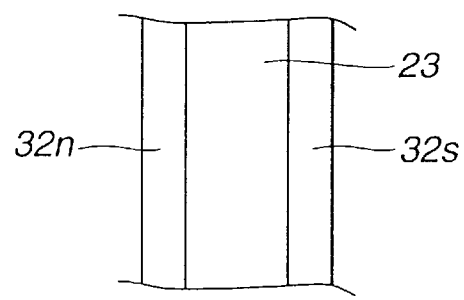
FIG. 6 is a view similar to FIG. 5, showing a cam ring.

Referring to FIGS. 3–4, each plunger 21 has a roller 30 mounted to the head, through which it comes in contact with the inner peripheral surface of the cam ring 23. Referring to FIGS. 4–5, permanent magnets 31s, 31n are mounted to both sides of the roller 30 arranged with the head of the plunger 21 so as to face the inner peripheral surface of the cam ring 23. Faces of the permanent magnets 31s, 31n fading the cam ring 23 are of different magnetic poles. On the other hand, referring to FIGS. 4 and 6, annular permanent magnets 32n, 32s axially separately mounted to the inner peripheral surface of the cam ring 23 such that the permanent magnet 32n faces the permanent magnet 31s of the plunger 21, and the permanent magnet 32s faces the permanent magnet 31 n of the plunger 21. Faces of the permanent magnets 32n, 32s of the cam ring 23 are of different magnetic poles.

Thus, the permanent magnets 31s, 31n arranged at both sides of the head of the plunger 21 are always attracted by the permanent magnets 32n, 32s of the cam ring 23, each being of a magnetic pole different from that of the corresponding permanent magnet 31s, 31n. This allows the plunger 21 to always be maintained in a certain orientation, so that the roller 30 of the plunger 21 always comes in smooth contact with the inner peripheral surface of the cam ring 21, enabling very efficient conversion of in-and-out motion of the plunger 21 to rotation of the cam ring 23.

As best seen in FIG. 2, the boss 25a of the right side cover as viewed in FIG. 2 is formed with a depression 33 which faces the end face of the cylinder block 22 and receives an annularly shaped first passage block 34. Likewise, an end of the housing 10 is formed with a depression 35 which faces an end face of the right side cover 25 as viewed in FIG. 2 and receives an annularly shaped second passage block 36. The first passage block 34, the boss 25a of the side cover 25, and the second passage block 36 are formed with connecting passages 37, 38, 39, respectively, which will be described later. The connecting passages 37, 38, 39 ensure fluid communication between the supply/discharge passages 14, 15 of the housing 10 and the inner passages 29.

The first and second passage blocks 34, 36 are axially slidably received in the depressions 33, 35 of the side cover 25 or the motor casing MC and the housing 10. Relative rotations between the first and second passage blocks 34, 36 and the motor casing MC and housing 10 are restricted by lock pins 40, 41. Thus, the first and second passage blocks 34, 36 are always rotated together with the motor casing MC and the housing 10, respectively.

Figure 7:
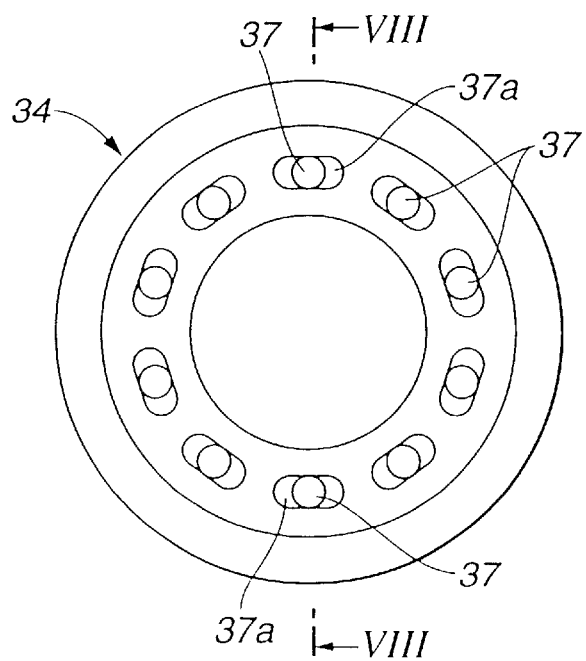
FIG. 7 is a view similar to FIG. 4, taken along the line VII—VII in FIG. 2.
Figure 8:
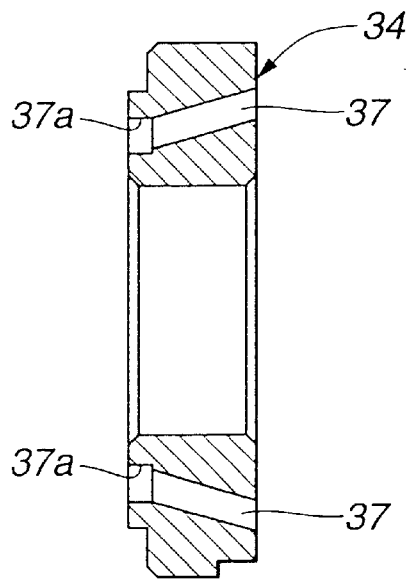
FIG. 8 is a view similar to FIG. 7, taken along the line VIII—VIII in FIG. 7.

Referring to FIGS. 7–8, the connecting passages 37 of the first passage block 34 are circumferentially equidistantly arranged to correspond to the inner passages 29 of the cylinder block 22 and pass through the first passage block 34 axially. A head face of the first passage block 34 facing the cylinder block 22 is formed flat to come in plane contact with the axial end face of the cylinder block 22. The head face of the first passage block 34 has ports 37a of the connecting passages 37, which are arranged on the same circle as that one formed by ends of the inner passages 29 of the cylinder block 22. Each port 37a is formed like a circular arc to communicate with the inner passage 29 of the cylinder block 22 within a predetermined range of angle of rotation. Specifically, the first passage block 34 also serves as a valve plate for carrying out switching of supply/discharge of hydraulic fluid with respect to the cylinder holes 22a in accordance with the angle of rotation of the cylinder block 22.

Figure 9:
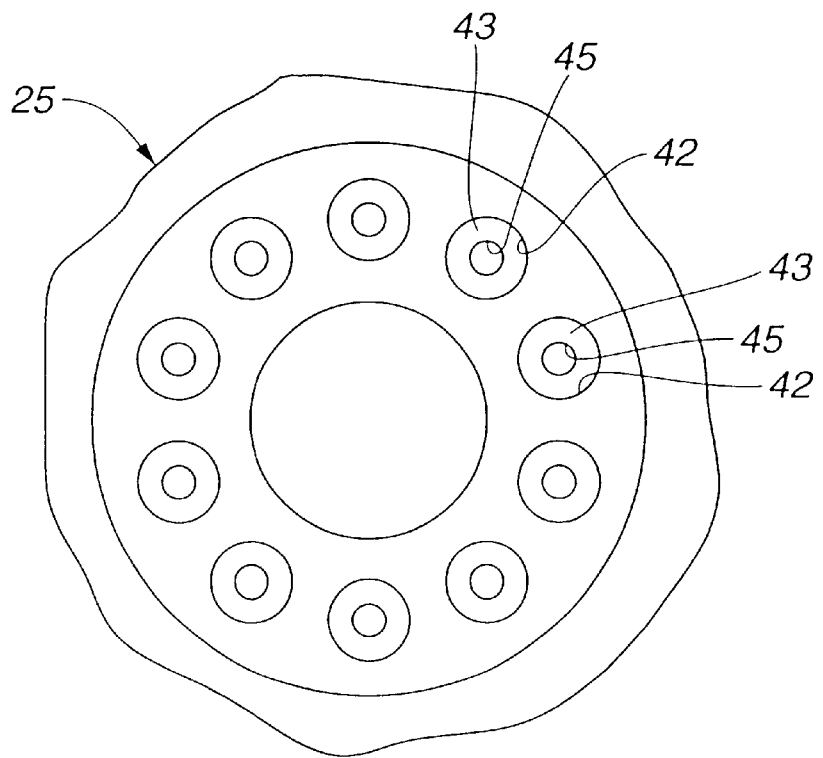
FIG. 9 is a view similar to FIG. 8, taken along the line IX—IX in FIG. 2.
Figure 10:
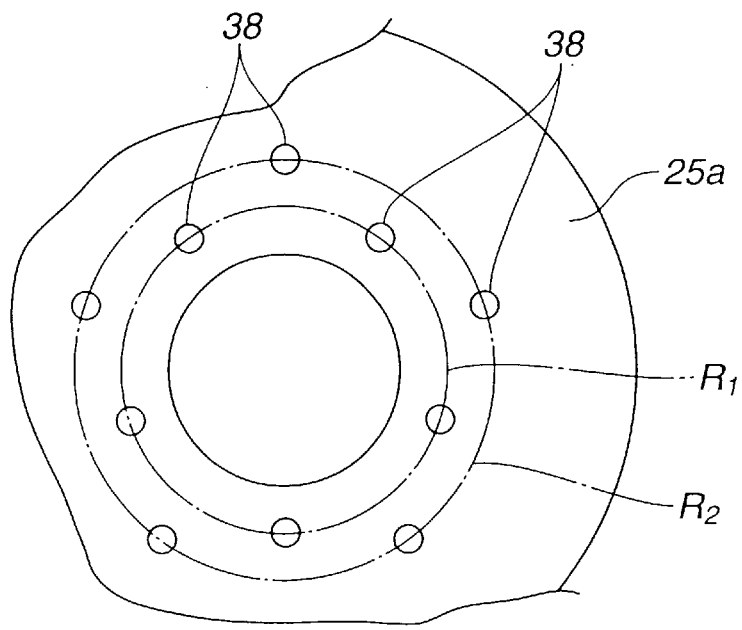
FIG. 10 is a view similar to FIG. 9, taken along the line X—X in FIG. 2.

Referring to FIGS. 2 and 9–10, the connecting passages 38 of the motor casing MC are circumferentially equidistantly arranged to correspond to the connecting passages 37 of the first passage block 34 and pass through the motor casing MC axially. An end of each connecting passage 38 on the side of the first passage block 34 has a cylinder hole 42 with larger diameter than that of an end of the connecting passage 37 of the first passage block 34 and for receiving a bottomed cylindrical piston 43 and a spring 44 for biasing the piston 43 to the first passage block 34. The piston 43 has a through hole 45 formed in the center of the bottom wall and for ensuring fluid communication between the corresponding connecting passages 38, 37 of the motor casing MC and the first passage block 34. An outer surface of the bottom wall of the piston 43 is formed flat, which is pressed against an end face of the first passage block 34 at the periphery outside the connecting passage 37, obtaining fluid-tight connection between the connecting passages 38, 37 of the motor casing MC and the first passage block 34.

Hydraulic fluid of the supply/discharge passages 14, 15 is introduced into the connecting passages 38 of the motor casing MC through the second passage block 36 as will be described later. The pressure of hydraulic fluid introduced into the connecting passages 38 acts on the inner surface of the bottom wall of the piston 43 to press the piston 43 against the first passage block 34 by force corresponding to the pressure of hydraulic fluid. And the head face of the first passage block 34 is in turn pressed against the end face of the cylinder block 22. In the first embodiment, the cylinder hole 42 of the motor casing MC and the piston 43 constitute a first hydraulic biasing mechanism.

Circumferentially alternate ones of the connecting passages 38 of the motor casing MC make pairs, ends of which on the side of the second passage block 36 are arranged on two concentric circles R1, R2 with different diameters as shown in FIG. 10.

Figure 11:
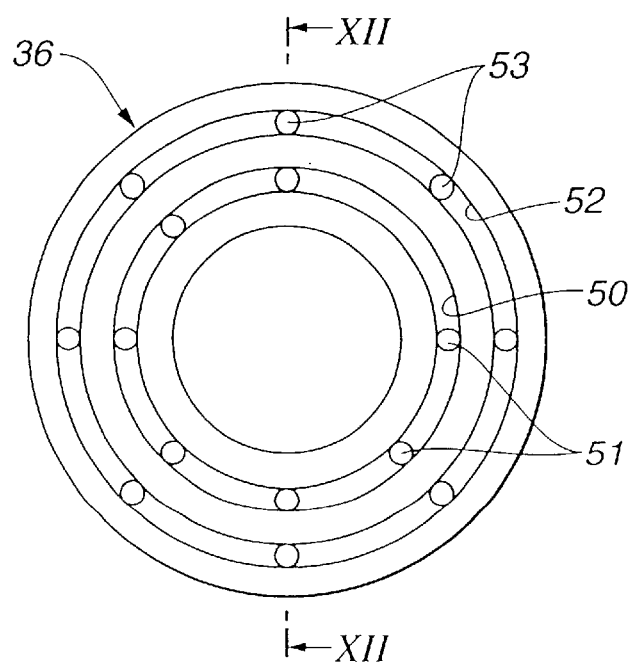
FIG. 11 is a view similar to FIG. 10, taken along the line XI—XI in FIG. 2.
Figure 12:
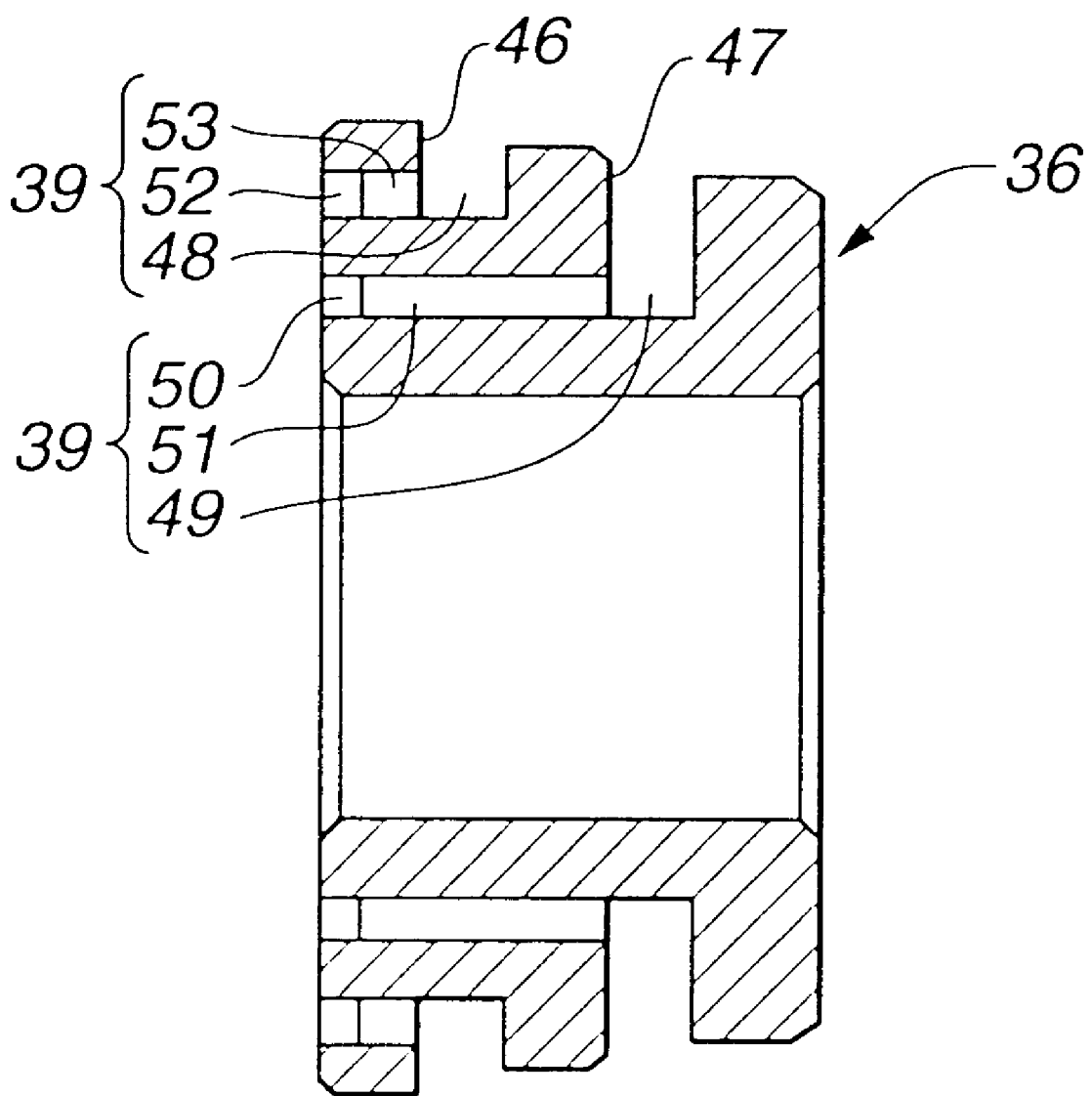
FIG. 12 is a view similar to FIG. 1 1, taken along the line XII—XII in FIG. 11.

Referring to FIGS. 2 and 12, the second passage block 36 have an outer periphery having two stepped portions 46, 47 with different diameters decreased from the head facing the motor casing MC to the base. The first and second stepped portions 46, 47 are formed with first and second annular grooves 48, 49 having predetermined radial depths, respectively. Referring also to FIG. 11, the second annular groove 49 is deeper than the first annular groove 48, and is connected to a small-diameter annular groove 50 through axial holes 51 formed in a head face of the second passage block 36 or a face thereof opposite to an end face of the motor casing MC. Likewise, the first annular groove 48 is connected to a large-diameter annular groove 52 formed in the head face of the second passage block 36 through axial holes 53. The head face of the second passage block 36 is formed flat to come in plane contact with the end face of the motor casing MC. As seen in FIG. 10, the small-diameter and large-diameter annular grooves 50, 52 of the head face of the second passage block 36 are opposite to the ends of the connecting passages 38 arranged on the small and large circles R1, R2, respectively. In the first embodiment, the second annular groove 49, the axial holes 51 and the small-diameter annular groove 50, and the first annular groove 48, the axial holes 53 and the large-diameter annular groove 52 constitute the connecting passages 39 of the second passage block 36.

On the other hand, the depression 35 of the housing 10 has an inner periphery having two stepped portions with different diameters decreased to correspond to the outer periphery of the second passage block 36, with which the first and second stepped portions 46, 47 of the second passage block 36 are axially slidably engaged. The supply/discharge passages 14, 15 of the housing 10 have openings formed in the above two portions of the depression 35, which communicate with the first and second annular passages 48, 49 or the connecting passages 39 of the second passage block 36. A disc spring 54 is arranged between a bottom of the depression 35 and a base end face of the second passage block 36 to bias the second passage block 36 to the motor casing MC. Seal rings 55a, 55b, 55c are arranged in the depression 35 on two axial sides of the supply/discharge passages 14, 15 to always ensure fluid-tight connection between the supply/discharge passages 14, 15 of the housing 10 and the connecting passages 39 of the second passage block 36.

Since the supply/discharge passages 14, 15 of the housing 10 ensure fluid communication between the first and second stepped portions 46, 47 of the second passage block 36 and the corresponding stepped portions of the depression 35, the pressure of hydraulic fluid of the supply/discharge passages 14, 15 always acts on the first and second stepped portions 46, 47 of the second passage block 36 to press the block 36 to the motor casing MC. In the first embodiment, stepped engagements of the depression 35 and the second passage block 36 which undergo the pressure of hydraulic fluid constitute a second hydraulic biasing mechanism.

Next, the operation of the first embodiment will be described.

When the passage selector valve 19 is in the neutral position, the supply/discharge passages 14, 15 of the housing 10 communicate with the reservoir 17, so that the motor casing MC and the cylinder block 22 of the hydraulic motor 13 are in free rotation. Thus, the right-wheel and left-wheel shafts 9, 8 receive equal traction from the propeller shaft through the differential gear 1. At this time, although neither of the supply/discharge passages 14, 15 is supplied with high-pressure hydraulic fluid, the piston 43 and the first passage block 34 are weakly pressed to the cylinder block 22 by the spring 44, and the second passage block 36 is weakly pressed to the motor casing MC by the disc spring 54.

In this state, when the controller switches the passage selector valve 19 to the right or left position, the supply/discharge passage 14 of the housing 10 communicates with the hydraulic pump 16, and the supply/discharge passage 15 of the housing 10 communicates with the reservoir 17. Thus, high-pressure hydraulic fluid is supplied from the supply/discharge passage 14 to half of the inner passages 29 of the cylinder block 22 through the connecting passages 39, 38, 37 of the second passage block 36, the motor casing MC and the first passage block 34. On the other hand, hydraulic fluid is returned from remaining half of the inner passages 29 of the cylinder block 22 to the supply/discharge passage 15 through the connecting passages 37, 38, 39. At this time, the plungers 21 of the cylinder block 22 make relative rotation of the cam ring 23 or the motor casing MC in a predetermined direction.

The pressure of hydraulic fluid supplied from the supply/discharge passage 14 of the housing 10 to the connecting passages 39 of the second passage block 36 acts on the first stepped portion 46 of the second passage block 36 to press the block 36 against the end face of the motor casing MC. Although the cam ring 23 or the motor casing MC is rotated at a predetermined speed with respect to the second passage block 36 which is at rest, plane contact between the two is maintained under the pressure of hydraulic fluid acting on the second passage block 36, obtaining continuous connection between the connecting passages 39, 38 with little leakage of hydraulic fluid. Specifically, since the second passage block 36 is always pressed to the motor casing MC by moderate force corresponding to the pressure of hydraulic fluid, a contact face between the two is surely covered with an oil film which ensures fluid-tight connection therebetween. This oil film also serves to reduce a slide resistance between the second passage block 36 and the motor casing MC.

The pressure of hydraulic fluid supplied from the second passage block 36 to the connecting passages 37 of the motor casing MC acts on the bottom wall of the piston 43 received in the cylinder hole 42 to press the bottom wall against the first passage block 34, the head face of which is in turn pressed against the axial end face of the cylinder block 22. This ensures fluid-fight connection between the connecting passages 38, 37 of the piston 43 and the first passage block 34, and plane contact between the first passage block 34 and the cylinder block 22. Although the first passage block 34 and the cylinder block 22 make relative rotation, continuous connection is obtained between the connecting passages 37 of the first passage block 34 and the inner passages 29 of the cylinder block 22 with little leakage of hydraulic fluid. Specifically, since the head face of the first passage block 34 is pressed to the cylinder block 22 by moderate force corresponding to the pressure of hydraulic fluid, a contact face between the two is surely covered with an oil film which ensures fluid-fight connection therebetween. This oil film also serves to reduce a slide resistance between the first passage block 34 and the cylinder block 22.

When the controller switches the passage selector valve 19 to the other position, supply/discharge of hydraulic fluid are reversed with respect to the supply/discharge passages 14, 15 of the housing 10, obtaining reverse rotation of the motor casing MC with respect to the cylinder block 22. This operation is not described in detail, since hydraulic fluid flows in the direction opposite to that one as described above, but with substantially the same action with respect to the first and second passage blocks 34, 36.

As described above, in the first embodiment, members which make relative rotation, i.e. the second passage block 36 and motor casing MC and the first passage block 34 and cylinder block 22, are constructed to come in plane contact with each other, the planecontact portions of which are pressed against each other under the pressure of hydraulic fluid for fluid communication between the passages of the two. This allows stable connection of the passages during a long period of time due to no arrangement of a member apt to deteriorate, such as a resilient seal ring. Further, since the planecontact portions for connection of the passages are pressed against each other under the pressure of hydraulic fluid, strict clearance control is not needed upon assembling, resulting in easy machining and assembling. Furthermore, the structure that the plane-contact portions of the members come in close contact with the peripheries of the passages allows easy and highly accurate machining of the close-contact portions of the members.

Still further, in the first embodiment, the first passage block 34 and the second passage block 36, which are axially in-and-out movably mounted to the motor casing MC and the cylinder block 22, can freely be separated therefrom upon occurrence of an anomaly. Thus, the first and second passage blocks 34, 36 are free from seizing, etc.

Furthermore, in the first embodiment, the outer periphery of the second passage block 36 and the inner periphery of the depression 35 of the housing 10 are formed with the stepped engagements, and the pressure of hydraulic fluid acts on the stepped engagement of the second passage block 36 to bias the block 36 to the motor casing MC. Thus, with simple structure having the very small number of parts, the head face of the second passage block 36 can be pressed against the end face of the motor casing MC. On the other hand, since the first passage block 34 is pressed against the end face of the cylinder block 22 through the pistons 43 as hydraulically biased, there is no need to form complicated stepped engagements on the outer periphery of the first passage block 34 and the motor casing MC, resulting in easy machining.

It is noted that the biasing mechanisms of the first and second passage blocks 34, 36 are not limited to those as described above. By way of example, referring to FIG. 13, a first passage block 134 may include the same biasing mechanism as that of the second passage block 36.

Figure 13:
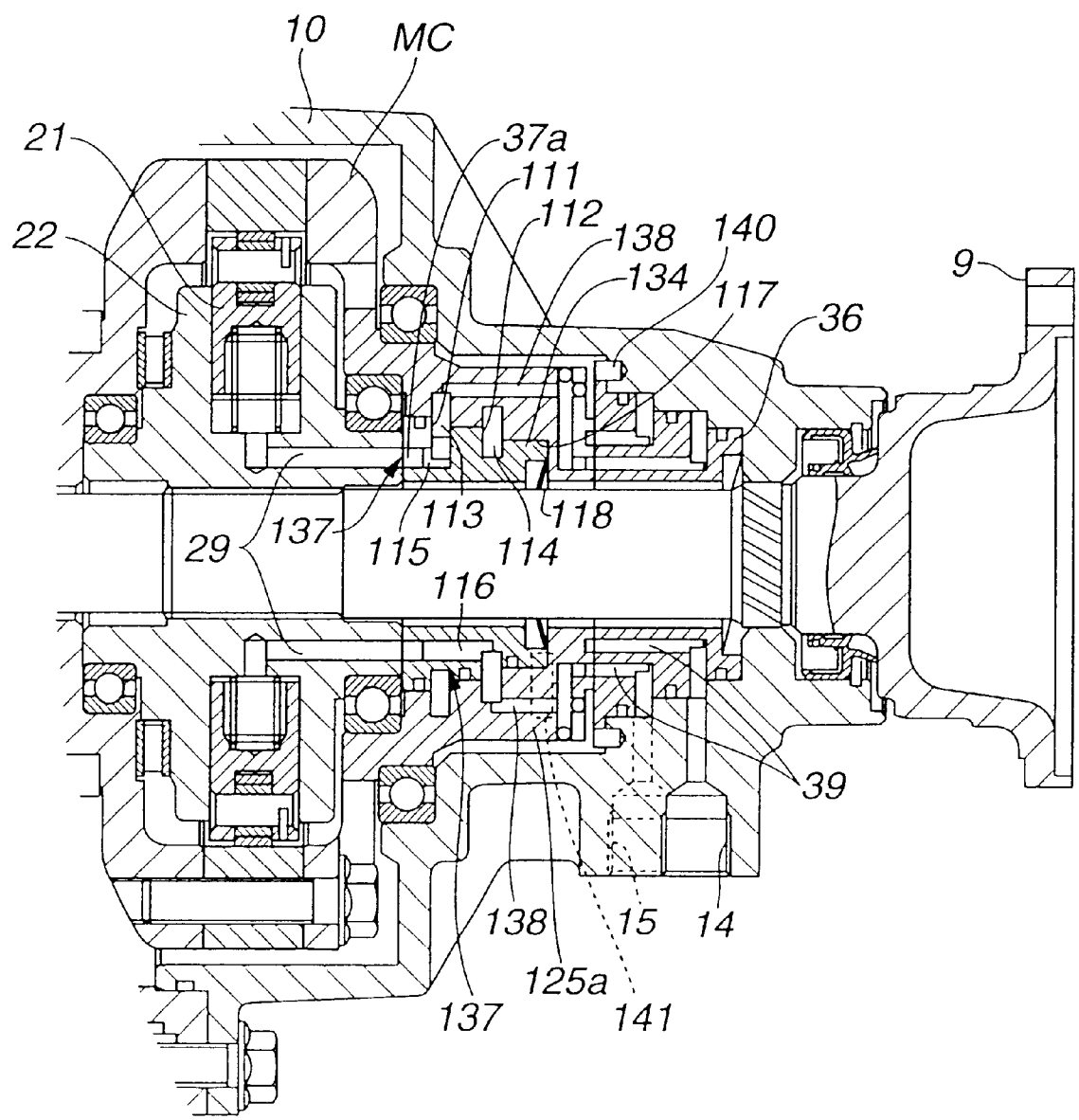
FIG. 13 is a view similar to FIG. 2, showing a second embodiment of the present invention.

FIG. 13 shows a second embodiment of the present invention. In the same way as the second passage block 36, the first passage block 134 has an outer periphery having two stepped portions 111, 112 with different diameters decreased from the head facing the cylinder block 22 to the base. The first and second stepped portions 111, 112 are formed with annular grooves 113, 114, respectively, the bottoms of which communicate with an end or a head face of the first passage block 134 on the side of the cylinder block 22 through axial holes 115, 116. The axial holes 115 communicating with the annular groove 113 and the axial holes 116 communicating with the annular groove 114 are alternately arranged on the same circle, and have circular ports 37a to open at the end face of the first passage block 22. The ports 37a are arranged on the same circle as that one formed by the ends of the inner passages 29 of the cylinder block 22. In the second embodiment, the annular grooves 113, 114 and the axial holes 115, 116 constitute connecting passages 137 of the first passage block 134.

A boss 125a of the motor casing MC is formed with a depression 117. The depression 117 has an inner periphery having two stepped portions with different diameters decreased to correspond to the outer periphery of the first passage block 134. The first passage block 134 is axially slidably received therein. Relative rotation between the motor casing MC and the first passage block 134 is restricted by a lock pin 141, and relative rotation between the housing 10 and the second passage block 36 is restricted by a lock pin 140. The motor casing MC is formed with connecting passages 138 for ensuring fluid communication between the connecting passages 39 having openings at the end of the second passage block 36 on two concentric circles with different diameters and the stepped portions 111, 112 of the first passage block 134. Through the connecting passages 138, the pressure of hydraulic fluid of the supply/discharge passages 14, 15 acts on the stepped portions 111, 112. A spring 118 is arranged between a bottom of the depression 117 and a base end face of the first passage block 134 to bias the block 134 to the end face of the cylinder block 22.

In the second embodiment, when high-pressure hydraulic fluid is introduced into the supply/discharge passage 14 of the housing 10 through operation of the passage selector valve, the pressure thereof acts on the stepped portion 111 of the first passage block 134 in the same way as the second passage block 36, which presses the head face of the first passage block 134 against the end face of the cylinder block 22. Thus, in the second embodiment also, fluid-tight connection between the inner passages 29 of the cylinder block 22 and the connecting passages 138 of the motor casing MC is ensured by the plane-contact portions of the cylinder block 22 and the first passage block 134.

Further, in the second embodiment, the mechanism for biasing the first passage block 134 to the cylinder block 22 includes no piston 43 which is needed in the first embodiment, enabling further reduction in the number of parts.

Figure 14:
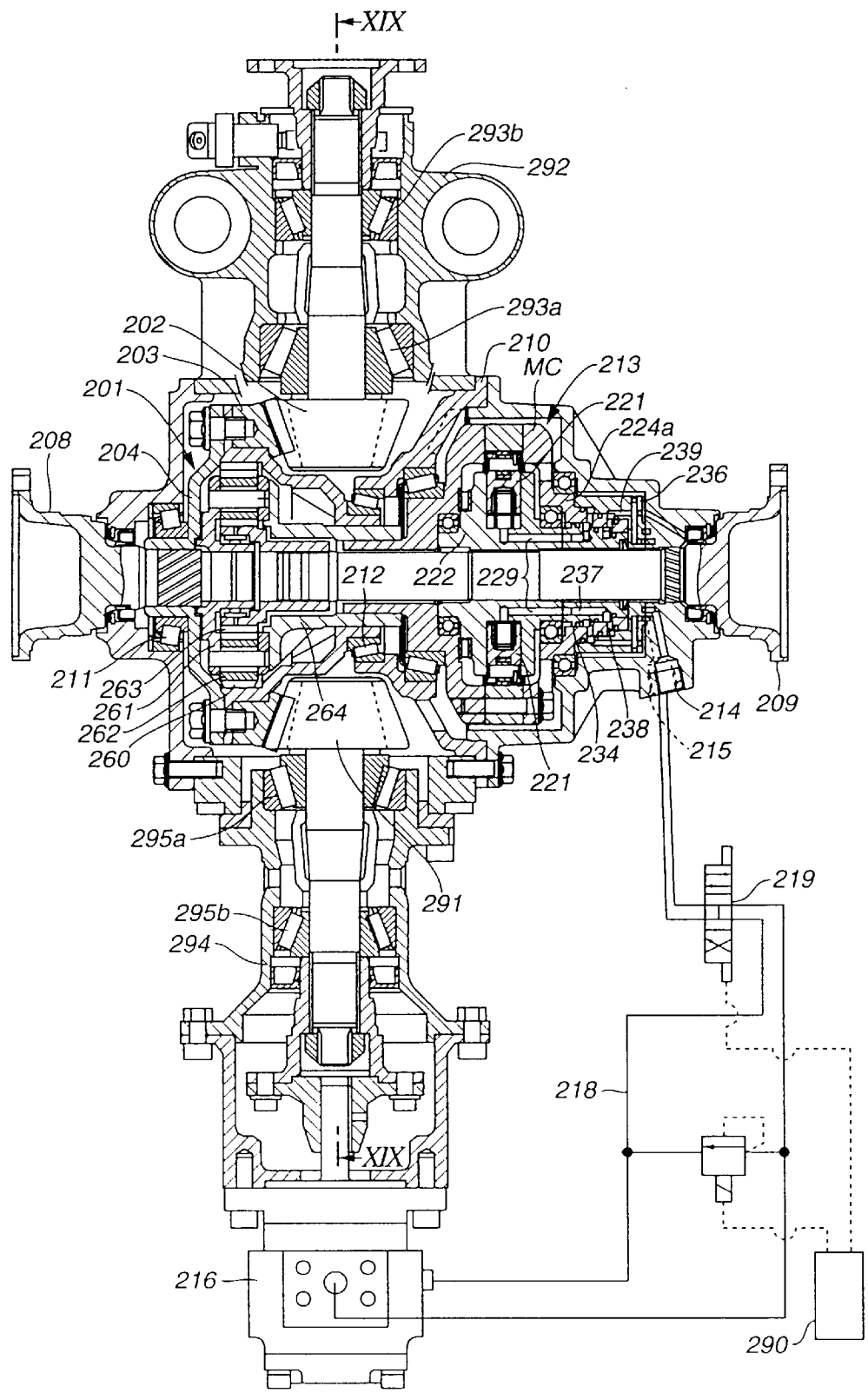
FIG. 14 is a view similar to FIG. 1, showing a third embodiment of the present invention.

FIGS. 14–19 show a third embodiment of the present invention. Referring to FIG. 14, the traction distributing apparatus comprises a planetary differential gear 201 and a radial-plunger hydraulic motor 213 integrally mounted in a housing 210. The hydraulic motor 213 provides relative torque to right-wheel and left-wheel shafts 209, 208 as required.

The differential gear 201 includes a differential casing 204 having a bevel-gear-like ring gear 203 at the outer periphery and rotatably supported in the housing 210 through bearings 211, 212. Torque of a drive pinion 202 connected to a propeller shaft, not shown, is transmitted to the differential casing 204 through the ring gear 203. An inner ring gear 260 is mounted to an inner peripheral wall of the differential casing 204, and is meshed with planetary gears 262 supported by the left-wheel shaft 208 through a carrier 261. A sun gear 263 connected to the right-wheel shaft 209 is disposed in the center of the inner ring gear 260, and is meshed with the planetary gears 262. Thus, torque transmitted from the drive pinion 202 to the differential casing 204 is distributed to the right-wheel and left-wheel shafts 209, 208 through the carrier 261 and the sun gear 263.

The hydraulic motor 213 includes plungers 221 radially mounted to a cylinder block 222 for in-and-out motion under the pressure of hydraulic fluid. This in-and-out motion of the plungers 221 rotates the motor casing MC. The hydraulic motor 213 is not described in detail, since the fundamental structure thereof is entirely the same as that of the hydraulic motor 13 as described in the first embodiment.

The cylinder block 222 of the hydraulic motor 213 is connected to the right-wheel shaft 209 in the same way as the first embodiment, while the motor casing MC is not spline coupled to the differential casing 204, but to a connecting arm 264 extending from the carrier 261. Thus, in the third embodiment, torque of the hydraulic motor 213 is directly transmitted to the wheel shafts 209, 208.

Formed at an end of the housing 210 are supply/discharge passages 214, 215 for ensuring supply/discharge of hydraulic fluid with respect to the hydraulic motor 213. The supply/discharge passages 214, 215 are connected to a hydraulic circuit 218 with a hydraulic pump 216 through a passage selector valve 219. The passage selector valve 219 is controlled by a controller 290 to switch the hydraulic motor 213 to free rotation, normal rotation or reverse rotation.

Figure 19:
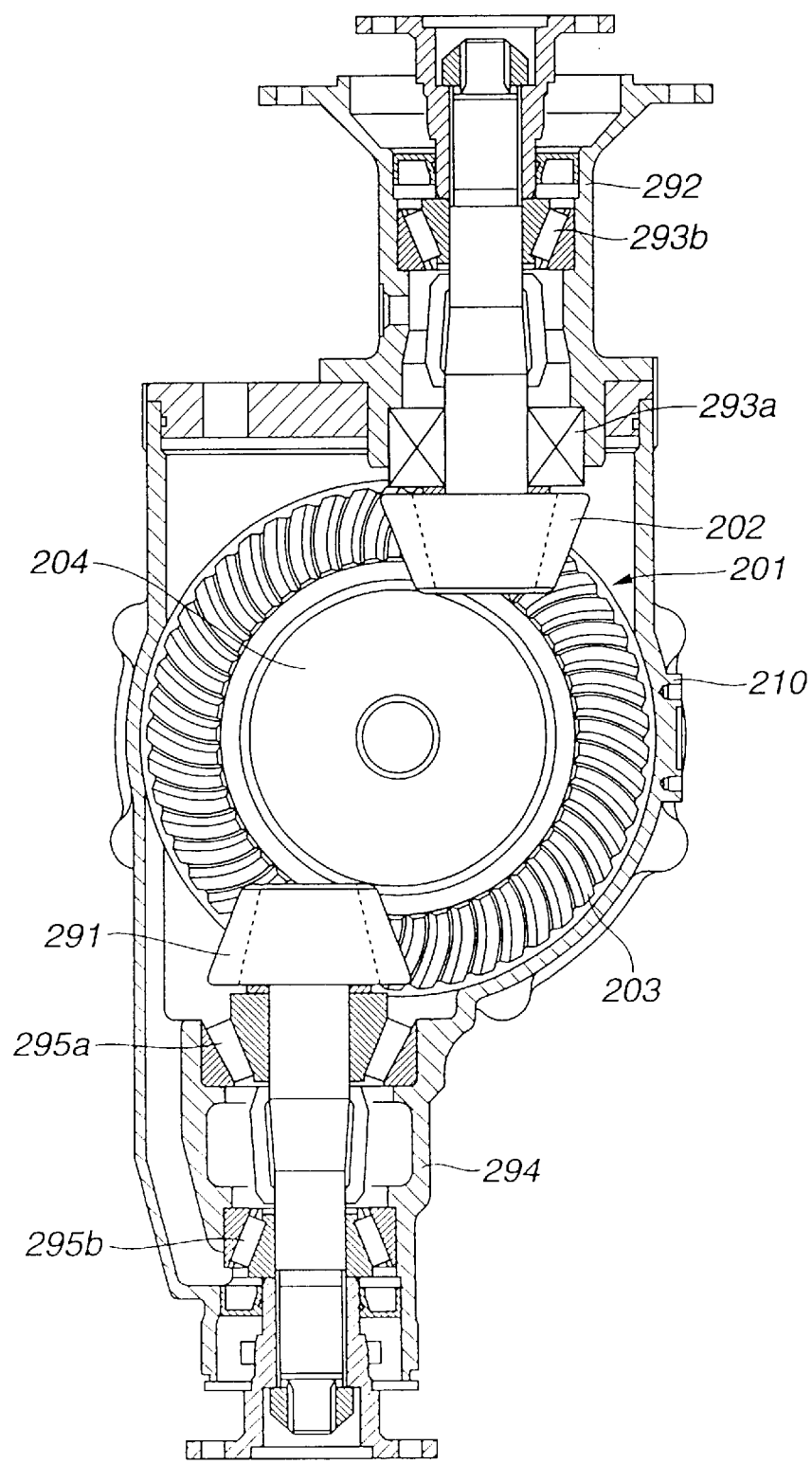
FIG. 19 is a view similar to FIG. 18, taken along the line XIX—XIX in FIG. 14.

The hydraulic pump 216 is driven by torque of the propeller shaft. Referring also to FIG. 19, in the third embodiment, driving force of the hydraulic pump 216 is not directly be got out of the drive pinion 202, but out of a driven pinion 291 meshed with the ring gear 203. The drive pinion 202 is supported, through bearings 293a, 293b, by a first support casing 292 extending in the radial direction of the housing 210. The driven pinion 291 is supported, through bearings 295a, 295b, by a second support casing 294 extending in the radial direction of the housing 210 opposite to the first support casing 292.

As seen in FIG. 19, the drive pinion 202 is meshed with the ring gear 203 of the differential gear 201 to be vertically offset with respect to the center of the ring gear 203. The driven pinion 291 is meshed with the ring gear 203 to be vertically offset with respect to the center of the ring gear 203 and opposite to the drive pinion 202. Specifically, the drive pinion 202 and the driven pinion 291 are disposed to be point symmetric with respect to the center of rotation of the ring gear 203. Thus, in the third embodiment, inclination of the differential casing 204 due to meshing reaction force of the drive pinion 202 and the ring gear 203 produced upon torque transmission from the pinion 202 to the gear 203 is held by the drive pinion 291, i.e. guide operation of the bearings 295a, 295b supporting the drive pinion 291, enabling the bearings 211, 212 supporting the differential casing 204 to surely be prevented from undergoing excessive loads.

Figure 15:
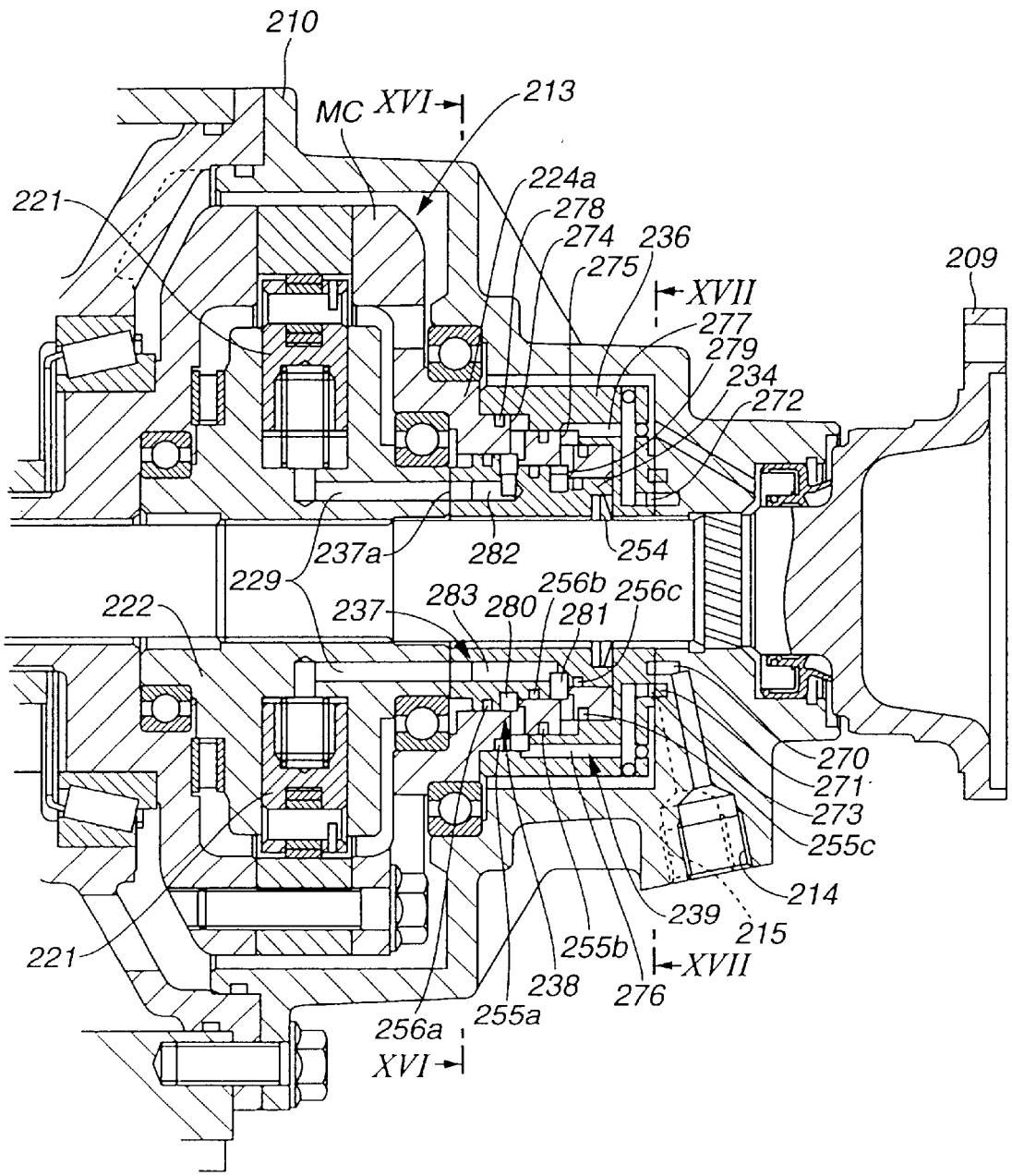
FIG. 15 is a view similar to FIG. 13, showing the main part of FIG. 14.
Figure 18:
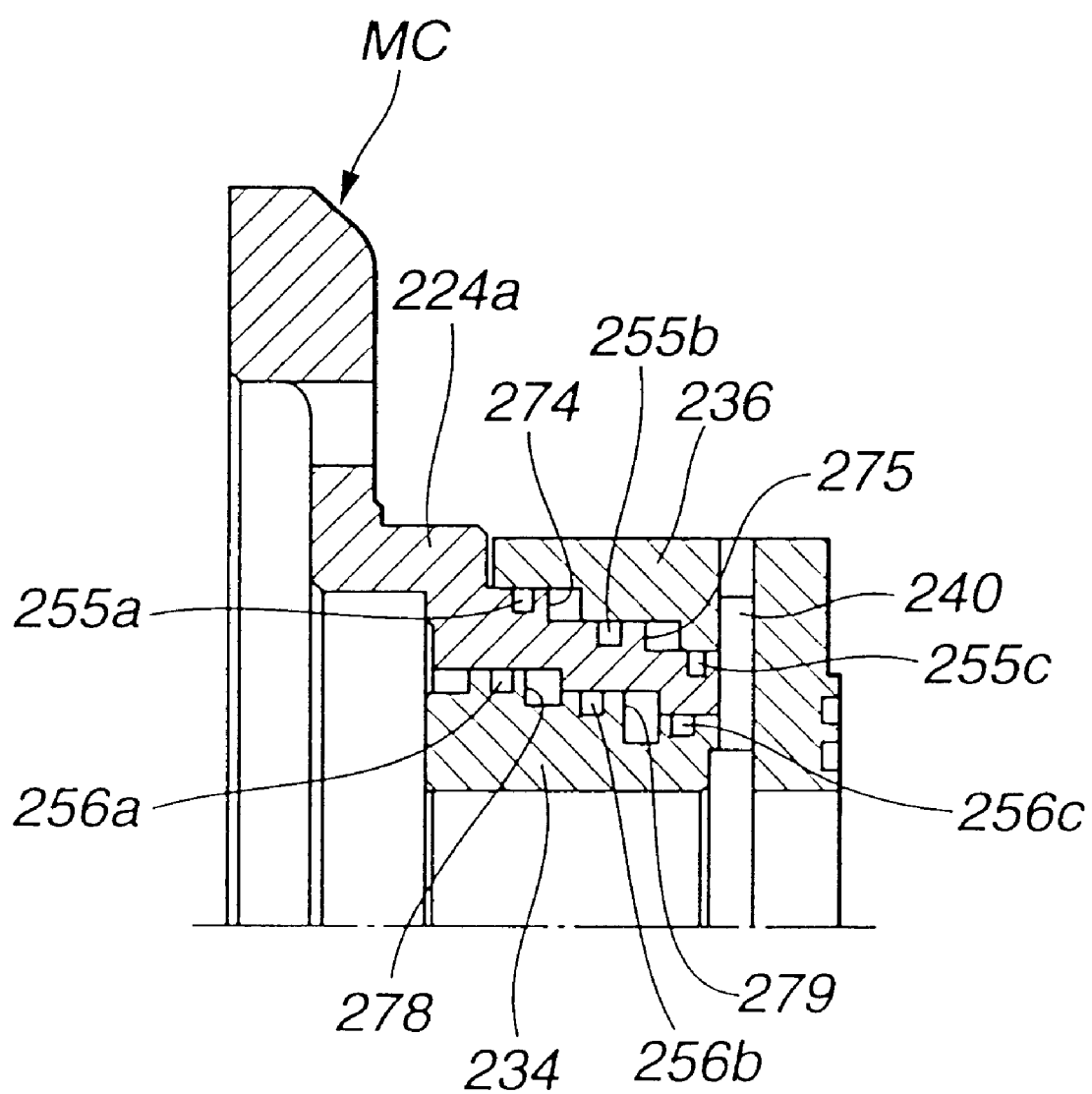
FIG. 18 is a view similar to FIG. 17, taken along the line XVIII—XVIII in FIG. 17.

Referring to FIGS. 15 and 18, a boss 224a of the motor casing MC has an inner periphery having two stepped portions with different diameters decreased from the side facing the cylinder block 222 to the side facing an end face of the housing 210. Axially slidably engaged with the inner periphery of the boss 224a is a first passage block 234 having an outer periphery having two stepped portions 278, 279 with different diameters decreased in the same way as the inner periphery of the boss 224a. Moreover, the boss 224a has an outer periphery having two stepped portions 274, 275 with different diameters decreased from the side facing the cylinder block 222 to the side facing the end face of the housing 21 in the same way as the inner periphery. Axially slidably engaged with the outer periphery of the boss 224a is a second passage block 236 having an inner periphery having two stepped portions with different diameters decreased in the same way as the outer periphery of the boss 224a. Referring to FIG. 18, relative rotation of the first and second passage blocks 234, 236 with respect to the boss 224a of the motor casing MC is restricted by a lock pin 240. Thus, in the third embodiment, the first and second passage blocks 234, 236 are always rotated together with the motor casing MC.

A head face of the first passage block 234 opposite to an end face of the cylinder block 222 and a head face of the second passage block 236 opposite to an inner end face of the housing 210 are formed flat to come in plane contact with the end faces of the cylinder block 222 and the housing 210. A base end face of the first passage block 234 is directly opposite to a back face of the second passage block 236, and a spring 254 is arranged between the two faces to bias them in the opposite directions.

Figure 17:
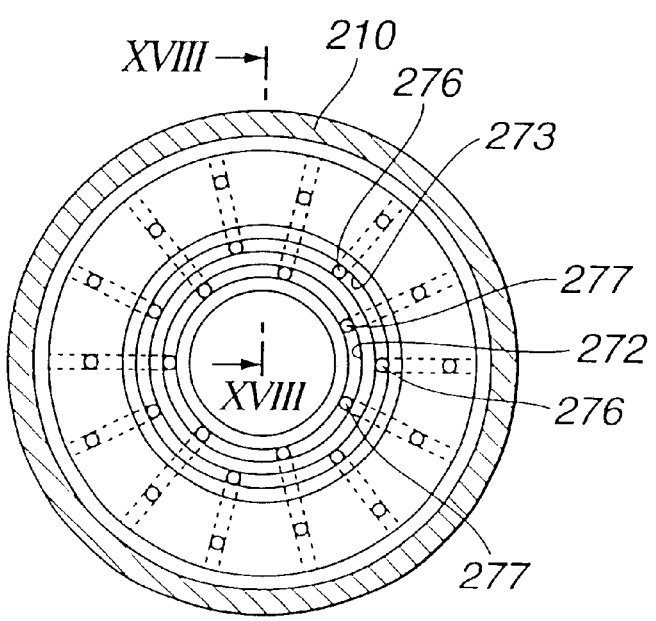
FIG. 17 is a view similar to FIG. 16, taken along the line XVII—XVII in FIG. 15.

The second passage block 236, the boss 234a of the motor casing MC, and the first passage block 234 are formed with connecting passages 239, 238, 237, respectively, which will be described later. The supply/discharge passages 214, 215 of the housing 210 and the inner passages 229 of the cylinder block 222 communicate with each other through the connecting passages 239, 238, 237. The supply/discharge passages 214, 215 of the housing 210 have a small-diameter annular port 270 and a large-diameter annular port 271 to open at the inner end face of the housing 210. Referring to FIG. 17, the head face of the second passage block 236 is formed with a small-diameter annular groove 272 and a large-diameter annular groove 273 to correspond to the annular ports 270, 271. As seen in FIGS. 15 and 17, the second passage block 236 is formed with communicating holes 276, 277 for ensuring fluid communication between the first and second stepped portions 274, 275 of the motor casing MC and the large-diameter and small-diameter annular grooves 273, 272, respectively. The annular grooves 273, 272 and the communicating holes 276, 277 constitute the connecting passages 239 of the second passage block 236.

The boss 224a of the motor casing MC is formed with a passage for ensuring fluid communication between the first stepped portions 274, 278 of the outer peripheries of the boss 224a and the first passage block 234, and a passage for ensuring fluid communication between the second stepped portions 275, 279 of the outer peripheries of the boss 224a and the first passage block 234. Those passages constitute the connecting passages 238 of the motor casing MC.

Figure 16:
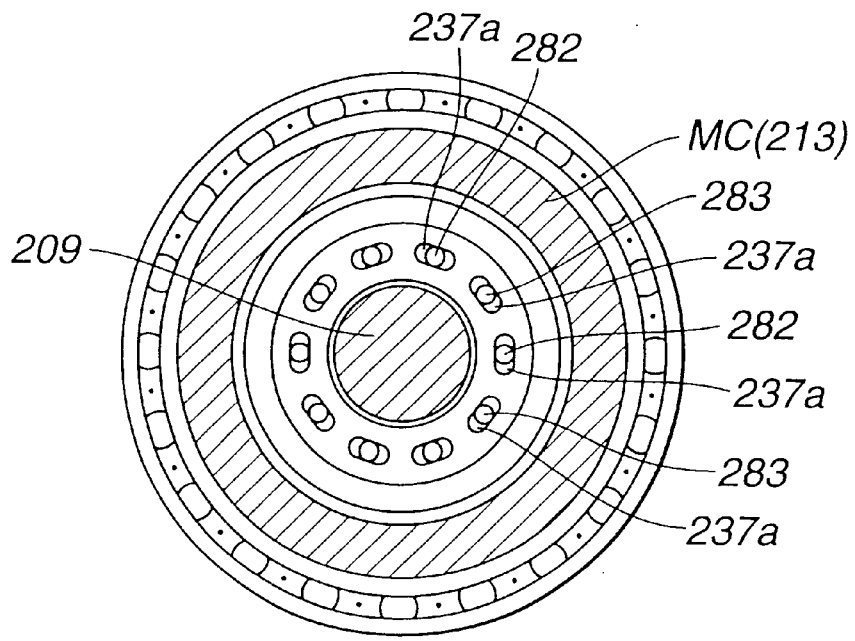
FIG. 16 is a view similar to FIG. 12, taken along the line XVI—XVI in FIG. 15.

The stepped portions 278, 279 of the outer periphery of the first passage block 234 are formed with annular grooves 280, 281, the bottoms of which communicate with the end face of the first passage block 234 on the side of the cylinder block 222 through axial holes 282, 283. The annular grooves 280, 281 and the axial holes 282, 283 constitute the connecting passages 237 of the first passage block 234. Referring to FIG. 16, the axial holes 282 communicating with the annular groove 280 and the axial holes 283 communicating with the annular groove 281 are alternately disposed on the same circle, each hole having a circular port 237a to open the end face of the cylinder block 222.

As best seen in FIG. 18, seal rings 255a–255c, 256a–256c are disposed before and behind the stepped portions 274, 275 of the outer peripheries of the boss 224a, respectively, to ensure fluid-tight connection between the second passage block 236 and the boss 224a and between the boss 224a and the first passage block 234.

In the third embodiment, when the passage selector valve 219 is in the neutral position, the supply/discharge passages 214, 215 are connected to each other, obtaining free rotation of the hydraulic motor 213.

In this state, when switching the passage selector valve 219 to the right or left position, high-pressure hydraulic fluid is supplied from the supply/discharge passage 214 to the cylinder block 222 through the connecting passages 239, 238, 237 of the second passage block 236, the motor casing MC and the first passage block 234. And hydraulic fluid discharged from the cylinder block 222 is supplied to the supply/discharge passage 215 through the connecting passages 237, 238, 239. This causes relative rotation of the cylinder block 222 and the motor casing MC in a predetermined direction, providing torque of the hydraulic motor 213 to the right-wheel and left-wheel shafts 209, 208.

At this time, since the first and second passage blocks 234, 236 are rotated together with the motor casing MC, relative rotation is obtained between the first passage block 234 and the cylinder block 222 and between the second passage block 236 and the housing 210. However, since the head faces of the first and second passage blocks 234, 236 are pressed, under the pressure of hydraulic fluid acting on the stepped portions thereof, against the end faces of the cylinder block 222 and the housing 210, fluid-tight connection is surely maintained between plane-contact portions of the first passage block 234 and the cylinder block 222 and between those of the second passage block 236 and the housing 210. Particularly, since the plane-contact portions undergo moderate force corresponding to the pressure of the supply/discharge passages 214, 215, they are always covered with oil films which allow optimal maintenance of fluid-tight connection. This oil film also serves to reduce a slide resistance between the two.

In the third embodiment, the first and second passage blocks 234, 236 are axially slidably mounted to the inner and outer peripheries of the boss 224a of the motor casing MC with their relative rotation with respect thereto being restricted. This contributes to shortening of the axial length of the two passage blocks 234, 236 arranged in the housing 210, resulting in a reduction in the axial size of the apparatus.

Moreover, in the third embodiment, since the end faces of the first and second passage blocks 234, 236 are opposite to each other, and the pre-loading spring 254 is arranged therebetween. Such structure allows the two passage blocks 234, 236 to be biased by a single spring 254, resulting in a reduction in the number of parts.

Having described the present invention with regard to the preferred embodiments, it is noted that the present invention is not limited thereto, and various changes and modifications can be made without departing from the scope of the present invention.

The entire contents of Japanese Patent Application 11-80861 filed on Mar. 25, 1999 are incorporated herein by reference.

What is claimed is:

1. A traction distributing apparatus for a motor vehicle with wheel shafts, comprising:
   a housing formed with first passages;
   a differential gear rotatably arranged in said housing, said differential gear including a casing, said differential gear distributing torque transmitted to said differential casing to the wheel shafts;
   a motor rotatably arranged in said housing, said motor hydraulically providing relative torque to the wheel shafts, said motor including an inner rotor and a casing, said inner rotor being connected to one of the wheel shafts, said motor casing being connected to one of said differential casing and another of the wheel shafts, said inner rotor and said motor casing being formed with second passages and third passages, respectively;
   a first block arranged between said inner rotor and said motor casing, said first block having an end face which slidably rotatably comes in plane contact with an end face of an inner rotor, said first block being formed with fourth passages which ensure fluid communication between said second passages and said third passages;
   a second block arranged between said motor casing and said housing, said second block having an end face which slidably rotatably comes in plane contact with an end face of one of adjacent members, said second block being formed with fifth passages which ensure fluid communication between said first passages and said third passages;
   a first biasing mechanism arranged with said first block, said first biasing mechanism hydraulically biasing said first block to said end face of said inner rotor; and
   a second biasing mechanism arranged with said second block, said second mechanism hydraulically biasing said second block to said end face of said one of said adjacent members.

2. The traction distributing apparatus as claimed in claim 1, wherein said first block is axially slidably engaged with said one of said adjacent members with its rotation being restricted, and said second block is axially slidably engaged with another of said adjacent members with its rotation being restricted.

3. The traction distributing apparatus as claimed in claim 2, wherein said one of said adjacent members includes said motor casing, and said another of said adjacent members includes said housing.

4. The traction distributing apparatus as claimed in claim 3, wherein said first biasing mechanism includes a cylinder hole and a bottomed cylindrical piston slidably received therein, said cylinder hole being axially formed through said motor casing and constituting said third passage, said piston having a bottom with a through hole and an outer surface coming in contact with said first block.

5. The traction distributing apparatus as claimed in claim 4, wherein said second biasing mechanism includes a stepped engagement of said second block and a corresponding stepped engagement of said housing, said stepped engagements undergoing the pressure of hydraulic fluid of said first passages.

6. The traction distributing apparatus as claimed in claim 3, wherein said first biasing mechanism includes a stepped engagement of said first block and a corresponding stepped engagement of said motor casing, said stepped engagements undergoing the pressure of hydraulic fluid of said first passages.

7. The traction distributing apparatus as claimed in claim 1, wherein said one of said adjacent members includes said housing.

8. The traction distributing apparatus as claimed in claim 7, wherein said first block is axially slidably engaged with an inner periphery of said one of said adjacent members with its rotation being restricted, and said second block is axially slidably engaged WMh an outer periphery of said one of said adjacent members with its rotation being restricted.

9. The traction distributing apparatus as claimed in claim 5, wherein each of said stepped engagements of said second biasing mechanism includes two portions with different diameters decreased from one side facing said motor casing to another side.

10. The traction distributing apparatus as claimed in claim 6, wherein each of said stepped engagements of said first biasing mechanism includes two portions with different diameters decreased from one side facing said inner rotor to another side.

11. A traction distributing apparatus for a motor vehicle with wheel shafts, comprising:
   a housing formed with first passages;
   a differential gear rotatably arranged in said housing, said differential gear including a casing, said differential gear distributing torque transmitted to said differential casing to the wheel shafts;
   a motor rotatably arranged in said housing, said motor hydraulically providing relative torque to the wheel shafts, said motor including an inner rotor and a casing, said inner rotor being connected to one of the wheel shafts, said motor casing being connected to one of said differential casing and another of the wheel shafts, said inner rotor and said motor casing being formed with second passages and third passages, respectively;
   a first block arranged between said inner rotor and said motor casing, said first block having an end face which slidably rotatably comes in plane contact with an end face of an inner rotor, said first block being formed with fourth passages which ensure fluid communication between said second passages and said third passages;
   a second block arranged between said motor casing and said housing, said second block having an end face which slidably rotatably comes in plane contact with an end face of one of adjacent members, said second block being formed with fifth passages which ensure fluid communication between said first passages and said third passages;
   first biasing means, arranged with said first block, for hydraulically biasing said first block to said end face of said inner rotor; and
   second biasing means, arranged with said second block, for hydraulically biasing said second block to said end face of said one of said adjacent members.

12. A traction distributing apparatus for a motor vehicle with wheel shafts, comprising:
   a housing formed with first passages;
   a differential gear rotatably arranged in said housing, said differential gear including a casing, said differential gear distributing torque transmitted to said differential casing to the wheel shafts;
   a motor rotatably arranged in said housing, said motor hydraulically providing relative torque to the wheel shafts, said motor including an inner rotor and a casing, said inner rotor being connected to one of the wheel shafts, said motor casing being connected to one of said differential casing and another of the wheel shafts, said inner rotor and said motor casing being formed with second passages and third passages, respectively;
   a first block arranged between said inner rotor and said motor casing, said first block being axially slidably engaged with one of adjacent members with its rotation being restricted, said first block having an end face which slidably rotatably comes in plane contact with an end face of an inner rotor, said first block being formed with fourth passages which ensure fluid communication between said second passages and said third passages;
   a second block arranged between said motor casing and said housing, said second block being axially slidably engaged with another of said adjacent members with its rotation being restricted, said second block having an end face which slidably rotatably comes in plane contact with an end face of said one of said adjacent members, said second block being formed with fifth passages which ensure fluid communication between said first passages and said third passages;
   a first biasing mechanism arranged with said first block, said first biasing mechanism hydraulically biasing said first block to said end face of said inner rotor; and
   a second biasing mechanism arranged with said second block, said second mechanism hydraulically biasing said second block to said end face of said one of said adjacent members.

13. A traction distributing apparatus for a motor vehicle with wheel shafts, comprising:
   a housing formed with first passages;
   a differential gear rotatably arranged in said housing, said differential gear including a casing, said differential gear distributing torque transmitted to said differential casing to the wheel shafts;
   a motor rotatably arranged in said housing, said motor hydraulically providing relative torque to the wheel shafts, said motor including an inner rotor and a casing, said inner rotor being connected to one of the wheel shafts, said motor casing being connected to one of said differential casing and another of the wheel shafts, said inner rotor and said motor casing being formed with second passages and third passages, respectively;
   a first block arranged between said inner rotor and said motor casing, said first block being axially slidably engaged with an inner periphery of one of adjacent members with its rotation being restricted, said first block having an end face which slidably rotatably comes in plane contact with an end face of an inner rotor, said first block being formed with fourth passages which ensure fluid communication between said second passages and said third passages;
   a second block arranged between said motor casing and said housing, said second block being axially slidably engaged with an outer periphery of said one of said adjacent members with its rotation being restricted, said second block having an end face which slidably rotatably comes in plane contact with an end face of another of said adjacent members, said second block being formed with fifth passages which ensure fluid communication between said first passages and said third passages;
   a first biasing mechanism arranged with said first block, said first biasing mechanism hydraulically biasing said first block to said end face of said inner rotor; and
   a second biasing mechanism arranged with said second block, said second mechanism hydraulically biasing said second block to said end face of said another of said adjacent members.

* * * * *